(12) United States Patent
Levin

(10) Patent No.: US 8,045,417 B2
(45) Date of Patent: Oct. 25, 2011

(54) ANALYZING 2-D SURFACE AND/OR BOREHOLE SEISMIC DATA TO LOCATE SUBSURFACE DIFFRACTORS

(75) Inventor: Stewart A. Levin, Centennial, CO (US)

(73) Assignee: Landmark Graphics Corporation, Houston, TX (US)

( * ) Notice: Subject to any disclaimer, the term of this patent is extended or adjusted under 35 U.S.C. 154(b) by 333 days.

(21) Appl. No.: 12/471,918

(22) Filed: May 26, 2009

(65) Prior Publication Data

US 2009/0228255 A1  Sep. 10, 2009

Related U.S. Application Data

(63) Continuation-in-part of application No. 11/674,526, filed on Feb. 13, 2007, now Pat. No. 7,545,704.

(51) Int. Cl.
*G01V 1/34* (2006.01)
*G01V 1/30* (2006.01)

(52) U.S. Cl. ............................. 367/72; 367/53; 702/14

(58) Field of Classification Search ............... 367/53, 367/56, 58, 72; 702/14, 16
See application file for complete search history.

(56) References Cited

U.S. PATENT DOCUMENTS

| | | | |
|---|---|---|---|
| 4,866,659 A | 9/1989 | Lin et al. | |
| 5,260,911 A | 11/1993 | Mason et al. | |
| 5,394,151 A | 2/1995 | Knaell et al. | |
| 6,049,507 A | 4/2000 | Allen | |
| 6,088,295 A | 7/2000 | Altes | |
| 6,151,556 A | 11/2000 | Allen | |
| 6,490,528 B2 | 12/2002 | Cheng et al. | |
| 6,553,315 B2 | 4/2003 | Kerekes et al. | |
| 6,584,409 B2 | 6/2003 | Wisecup | |
| 6,865,489 B2 | 3/2005 | Jing | |
| 7,085,195 B2 | 8/2006 | Taner et al. | |

(Continued)

FOREIGN PATENT DOCUMENTS

WO  9115783  10/1991

OTHER PUBLICATIONS

F. Steve Schilt, Sidney Kaufman, and George H. Long; "A Three-Dimensional Study of Seismic Diffraction Patterns from Deep Basement Structure"; Geophysics; Dec. 1981; pp. 1673-1683; vol. 46, No. 12.

(Continued)

*Primary Examiner* — Ian Lobo
(74) *Attorney, Agent, or Firm* — Meyertons Hood Kivlin Kowert & Goetzel, P.C.; Jeffrey C. Hood; Mark K. Brightwell

(57) ABSTRACT

A system and method for locating subsurface diffractors. The method operates on two-dimensional (2-D) seismic data that includes one or more 2-D seismic lines. The 2-D seismic data may be preprocessed to enhance diffracted energy. For each hypothetical diffractor location in a set of hypothetical diffractor locations, the method involves analyzing at least a subset of the seismic traces of the one or more 2-D seismic lines, in order to compute a value indicating an extent to which those seismic traces contain diffraction arrivals consistent with the hypothetical diffractor location. The method may further involve generating, storing and displaying an image (or map) based on the computed values. The image may illustrate areas of high, intermediate and low diffraction, and may be used to assess the formation.

20 Claims, 10 Drawing Sheets

U.S. PATENT DOCUMENTS

| | | |
|---|---|---|
| 7,376,539 B2 | 5/2008 | Lecomte |
| 7,739,051 B2 * | 6/2010 | Gulunay .................... 702/14 |
| 2006/0015259 A1 | 1/2006 | Gulunay |

OTHER PUBLICATIONS

T.J. Moser, E. Landa, and S.A. Petersen; "Velocity model based diffraction filtering"; SEG Extended Abstracts; 1999; 4 pages.

William S. Harlan, Jon F. Claerbout, and Fabio Rocca; "Signal/noise separation and velocity estimation" Geophysics; Nov. 1984; pp. 1869-1880; vol. 49, No. 11.

V. Khaidukov, E. Landa, and T.J. Moser; Diffraction imaging by a focusing-defocusing approach; by Khaidukov, Landa, and Moser, in SEG Extended Abstracts, 2003.

Cohen, et al.; "Local discontinuity measures for 3-D seismic data"; Geophysics Journal; vol. 67, No. 6; Nov.-Dec. 2002; pp. 1933-1945.

International Search Report and Written Opinion for application No. PCT/US2008/053808, mailed Nov. 27, 2008.

Milkereit et al. Multiattribute Processing of Seismic Data: Application to Dip Displays. Canadian Journal of Exploration Geophysics. vol. 26. Nos. 1&2. Dec. 1990. pgs. 47-53.

Keggin et al. Attenuation of multiple diffractions by multi-azimuth streamer acquisition. EAGE 64th Conference & Exhibition. Florence, Italy. May 27-30, 2002.

Rastogi et al. Optimal aperture width selection and parallel implementation of Kirchoff Migration Algorithm. SPG 4th Conference & Exposition on Petroleum Geophysics. Mumbai, India. Jan. 7-9, 2002.

* cited by examiner receive two-dimensional (2-D) seismic data that includes one or more 2-D seismic lines, where each of the 2-D seismic lines includes a plurality of seismic traces and a respective plurality of trace positions  810 for each hypothetical diffractor location L in a set of hypothetical diffractor locations, analyze at least a subset of the seismic traces of the one or more 2-D seismic lines to compute a corresponding value $V_L$ indicating an extent to which those seismic traces contain diffraction arrivals that are consistent with the hypothetical diffractor location  820 generate an image based on the computed values $V_L$  830

Fig. 8

ANALYZING 2-D SURFACE AND/OR BOREHOLE SEISMIC DATA TO LOCATE SUBSURFACE DIFFRACTORS

RELATED APPLICATION DATA

This application is a continuation in part of U.S. application Ser. No. 11/674,526 filed on Feb. 13, 2007 now U.S. Pat. No. 7,545,704, entitled "Performing 3-D Scatterer Imaging From 2-D Seismic Data", invented by Stewart A. Levin, which is hereby incorporated by reference in its entirety.

FIELD OF THE INVENTION

The present invention generally relates to seismic data processing, and more particularly, to a mechanism for locating subsurface diffractors based on an analysis of seismic data.

DESCRIPTION OF THE RELATED ART

Seismic exploration involves the study of underground formations and structures. In seismic exploration, one or more sources of seismic energy may emit waves into a region of interest, such as a formation. These waves enter the formation and may be scattered, e.g., by reflection and/or refraction. One or more sensors are employed to capture the scattered waves, thereby generating seismic data. (The signal captured by a sensor in response to a single shot or activation of a source is referred to as a "trace".) The seismic data may be analyzed to extract information regarding the structure and properties of the region of the earth being explored.

In general, the purpose of seismic exploration is to map or image a formation (a portion of the earth's subsurface) by transmitting energy into the formation and recording the response signals that are generated by structures within the formation. The energy transmitted into the formation is typically acoustic energy. (A given response signal may be interpreted as a superposition of components arriving from various directions along various paths from the corresponding source to the corresponding sensor, i.e., paths involving one or more reflections and/or refractions due to various subsurface interfaces.) The acoustic energy may originate from various sources. For example, explosions or seismic vibrators are often used in land surveys, while air guns are often used marine surveys. The sources and/or sensors may be positioned at the earth's surface, near the earth's surface, above the earth's surface, within the formation, or any combination thereof. (In marine surveys, it is typical for the sources and sensors to be towed behind a boat. The sources and sensors are thus at or near the sea surface.) (Sources and/or sensors may be situated within a formation by inserting them into boreholes drilled into the formation.)

Seismic exploration typically uses one or more sources and typically a large number of sensors or detectors. The sensors used to detect the returning seismic energy are typically geophones (used in land surveys) or hydrophones (used in marine surveys).

Each time a source is activated, the source generates a seismic signal that travels into the formation and is reflected and refracted from discontinuities of various types in the subsurface, including rock layer boundaries. In general, a partial reflection or partial refraction of the seismic signal may occur each place there is a change in the elastic properties of the subsurface materials. The seismic signals that arrive at the sensors are detected. The detected signals are digitized as a function of time. Each data point includes a signal amplitude and has a corresponding signal acquisition time.

Seismic data are the result of recording the acoustic signals that have been reflected and/or refracted from discontinuities in the subsurface. The digital samples that make up a seismic trace are usually acquired at equal intervals in time. In addition, each sample in a conventional digital seismic trace is associated with a travel time. Where the source and sensor are both located on the surface, each sample of the trace has a two-way travel time equal to the sum of a downward travel time from the source to a subsurface reflector and a return travel time from the reflector to the sensor.

Multiple activation/recording combinations may be analyzed to create a near continuous 2-D or 3-D profile of the subsurface that can extend over a large area. In a two-dimensional (2-D) seismic survey, the goal is to image one or more 2-D vertical slices (flat or curved) of the earth's subsurface. Thus, seismic traces are acquired along one or more linear or curvilinear tracks with source-to-sensor midpoints being aligned closely to the respective track. A "2-D seismic line" is the set of traces acquired along a given track, in response to one or more source activations. (Thus, a 2-D seismic line is two-dimensional, one of the dimensions representing position along the track and the other dimension representing time. The 2-D seismic line may be processed so that the time dimension is transformed to depth. So the 2-D seismic line may also be interpreted as a 2-D surface in space.) In a three-dimensional (3-D) survey, the goal is to image a 3-D volume of the earth's subsurface. Thus, the seismic traces are acquired so that the source-to-sensor midpoints cover a dense 2-D array over an area of interest. "Dense" means no more than 50 meters or 100 meters between neighboring midpoints in the grid, and typically much less than that, e.g., 12.5 meters to 25 meters.

In a "raw" or "preprocessed" form, a "pre-stack" seismic trace will exist for every pair of source and sensor locations. The general goal of seismic processing is to transform the acquired seismic data into a form that is useful for some aspect of seismic interpretation such as, but not limited to, structural and/or stratigraphic inference of the subsurface geology, lithology and/or fluid estimation for potential subsurface hydrocarbon reservoirs. Seismic processing techniques and seismic data organization will generally depend upon the final interpretation objectives, the quality of the seismic data, the complexity of the subsurface, and many other factors.

Seismic data that have been properly acquired and processed can provide a wealth of information to explorationists (e.g., individuals within an oil company whose job it is to identify potential drilling sites). For example, a seismic profile gives an explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of the seismic survey data, estimates of subsurface rock discontinuities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Prior to the mid 1980s, most seismic data acquisition was two-dimensional (2-D), including a number of individual seismic lines acquired in some coarse pattern over the exploration area. From interpretation of these data, three-dimensional (3-D) structural maps were generated to help evaluate the prospect. Subsequently, widespread acceptance of finely-sampled 3-D seismic acquisition methods relegated 2-D projects to a small percentage of new data acquisition, with most 2-D work comprising the reprocessing of pre-existing 2-D data grids.

In the last few years, 2-D data acquisition has seen a resurgence in the form of huge regional 2-D seismic grids, such as the GulfSpan project, which covers much of the northern Gulf of Mexico. Such acquisition is designed to provide a regional framework. However, this acquisition has interline spacing measured in kilometers, and thus, is not generally suited to 3-D seismic migration imaging. The reason that 3-D migration fails is that it sweeps each given 2-D line sideways and upwards along approximately circular arcs into the spaces between the lines. This creates highly-aliased phantom structure within the gaps. (In theory, any or all of the locations along the arc could be the true image of the seismic line energy. In practice, it is often assumed with scant justification to be directly below the line itself.)

The consequence of the inability of 3-D migration to reliably image between coarsely spaced 2-D lines is that interpretation of the interline gaps must be based on what can be correlated between adjacent (or intersecting) 2-D lines. Essentially either a smooth surface can be drawn connecting correlated reflectors between the lines or, where such a correlation cannot be made, it can only be inferred that there is some unknown structure within the gap that disrupts or terminates reflectors. This does not provide reliable knowledge about unpredictable structure between the lines, precisely the information that dense 3-D acquisition and imaging provides. Indeed, this is why, despite the high relative cost, 3-D has repeatedly proven a valuable investment. Commonly, such unpredictable structures form the flow barriers sealing hydrocarbons into reservoirs.

Therefore, it would be desirable to provide a way to detect and locate such "unpredictable" structures directly from the 2-D seismic data grid. Such a capability would provide multiple benefits. Infill acquisition to obtain dense 3-D coverage could be more intelligently targeted at areas where structural complexity has been determined. Vintage 2-D grids over producing reservoirs could be reprocessed to better understand flow barrier geometries and production history. Also, higher confidence could be placed on 2-D line correlations and associated reservoir volumetric estimates when there is little or no unpredictable structure between the lines.

SUMMARY

Various embodiments are described of a system and method for locating subsurface diffractors in the earth's subsurface.

In one set of embodiments, a method for locating subsurface diffractors may involve receiving two-dimensional (2-D) seismic data obtained from a seismic survey of a formation, where the 2-D seismic data includes one or more 2-D seismic lines. Each of the 2-D seismic lines may include a plurality of seismic traces and a respective plurality of trace positions. The trace positions may specify where the seismic traces were obtained.

The method may also involve performing a set of operations for each hypothetical diffractor location in a set of hypothetical diffractor locations.

The set of operations may include analyzing at least a subset of the seismic traces of the one or more 2-D seismic lines to determine whether those seismic traces contain diffraction arrivals that are consistent with the hypothetical diffractor location. Each of the hypothetical diffractor locations may satisfy the condition that none of the trace positions of the one or more 2-D seismic lines lies within a 3-D neighborhood of diameter 200 meters centered on the hypothetical diffractor location.

The set of operations may also include, in response to determining that the analyzed seismic traces contain diffraction arrivals that are consistent with the hypothetical diffractor location, storing information identifying the hypothetical diffractor location as a probable diffractor location.

In another set of embodiments, a method for locating subsurface diffractors may involve receiving 2-D seismic data that includes one or more 2-D seismic lines, where each of the 2-D seismic lines includes a plurality of seismic traces and a respective plurality of trace positions. The trace positions specify where the seismic traces were obtained.

The method may also involve, for each hypothetical diffractor location L in a set of hypothetical diffractor locations, analyzing at least a subset of the seismic traces of the one or more 2-D seismic lines to compute a value $V_L$ indicating an extent to which those seismic traces contain diffraction arrivals that are consistent with the hypothetical diffractor location. Each of the hypothetical diffractor locations may satisfy a condition that none of the trace positions of the one or more 2-D seismic lines lies within a 3-D neighborhood of diameter 200 meters centered on the hypothetical diffractor location.

The method may also involve generating an image based on the computed values $V_L$.

In some embodiments, a computer-accessible memory medium that stores program instructions is contemplated. The program instructions are executable by a computer system to implement a method, e.g., any of the method embodiments described herein, or, any combination of the method embodiments described herein, or, any subset of any method embodiment described herein.

In some embodiments, a computer system is configured to include a processor (or a set of processors) and memory medium. The memory medium stores program instructions. The processor is configured to read and execute the program instructions. The program instructions are executable to implement a method, e.g., any of the various method embodiments described herein, or, any combination of the method embodiments described herein, or, any subset of any method embodiment described herein. The computer system may be realized in any of various forms.

BRIEF DESCRIPTION OF THE DRAWINGS

The foregoing, as well as other objects, features, and advantages of this invention may be more completely understood by reference to the following detailed description, when read together with the accompanying drawings.

FIG. 8 illustrates another set of embodiments of a method for locating subsurface diffractors.

Figure 1:
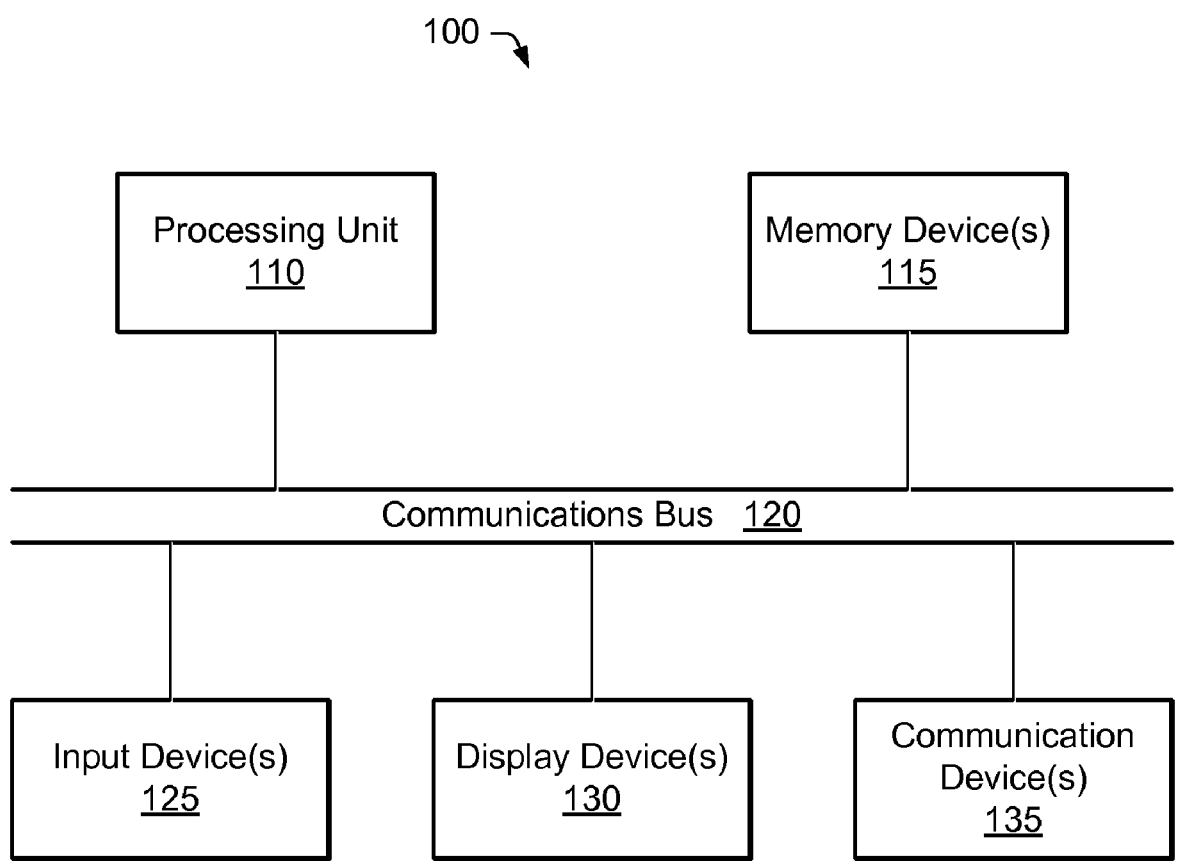
FIG. 1 illustrates one embodiment of a computer system 100 for analyzing seismic data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims.

DETAILED DESCRIPTION OF THE EMBODIMENTS

The present invention may be realized in any of various forms. For example, in some embodiments, the present invention may be realized as a computer-implemented method, a computer-accessible memory medium, or a computer system. In other embodiments, the present invention may be realized using one or more custom designed hardware devices such as ASICs or FPGA's.

A memory medium is a medium configured for the storage and retrieval of information. Examples of memory media include: various kinds of semiconductor memory such as RAM and ROM; various kinds of magnetic media such as magnetic disk, tape, strip, and film; various kinds of optical media such as CD-ROM and DVD-ROM; various media based on the storage of electrical charge and/or other physical quantities; media fabricated using various lithographic techniques; etc.

A computer-accessible memory medium is a memory medium that stores program instructions and/or data, where the program instructions are executable by a computer system to implement a method, e.g., any of a method embodiments described herein, or, any combination of the method embodiments described herein, or, any subset of any of the method embodiments described herein.

In some embodiments, a computer system may be configured to include a processor (or a set of processors) and a memory medium. The memory medium stores program instructions. The processor is configured to read and execute the program instructions. The program instructions are executable to implement any of the various method embodiments described herein (or, any combination of the method embodiments described herein, or, any subset of any of the method embodiments described herein). The computer system may be realized in any of various forms. For example, the computer system may be a personal computer (in any of its various realizations), a workstation, a computer on a card, a server computer, a client computer, a hand-held device, etc.

In some embodiments, a set of computers distributed through a network may be configured to partition the effort of executing a computational method (e.g., any of the method embodiments disclosed herein).

FIG. 1 illustrates one set of embodiments of a computer system 100 for analyzing seismic data. Computer system 100 may include a processing unit 110, a set of memory devices 115, a communication bus 120, a set of input devices 125, and one or more display devices 130. The set of memory devices 115 may include any of various memory media and memory access devices. For example, memory devices 115 may include semiconductor RAM and ROM devices as well as mass storage devices such as CD-ROM drives, magnetic disk drives, magnetic tape drives, storage area networks (SANs), etc.

Processing unit 110 is configured to read and execute program instructions stored in one or more of the memory devices 115. Processing unit 110 may couple to memory devices 115 through communication bus 120 (or through a collection of busses). Under the control of the program instructions, processing unit 110 may operate on seismic data stored in one or more of the memory devices 115. Processing unit 110 may include one or more programmable processors (e.g., microprocessors).

In one embodiment, the program instructions may be provided to the system 100 via a memory medium such as a set of one or more CD-ROMs. The program instructions may be loaded into a hard disk of the system 100. The program instructions may be loaded into semiconductor memory at execution time.

One or more users may supply input to the system 100 through the set of input devices 125. Input devices 125 may include devices such as keyboards, mouse devices, touch-sensitive pads, touch-sensitive screens, digitizing pads, track balls, joy sticks, light pens, data gloves, eye orientation sensors, head orientation sensors, etc. The set of display devices 130 may include devices such as monitors, projectors, head-mounted displays, printers, plotters, etc.

In one embodiment, system 100 may include one or more communication devices 135, e.g., a network interface card for interfacing with a computer network. For example, seismic data gathered at a remote site may be transmitted to the system 100 through a computer network. The system 100 may receive the seismic data from the computer network using the network interface card (or some other communication interface).

The system 100 may also include one or more other devices such as a graphics accelerator, a set of speakers, a data acquisition board, a video camera, etc.

The system 100 may be equipped with a software infrastructure that includes, e.g., an operating system and a graphics API.

The system 100 may store software (program instructions and/or data structures) for locating subsurface diffractors based on 2-D seismic data according to any of the various embodiments described herein.

Figure 2:
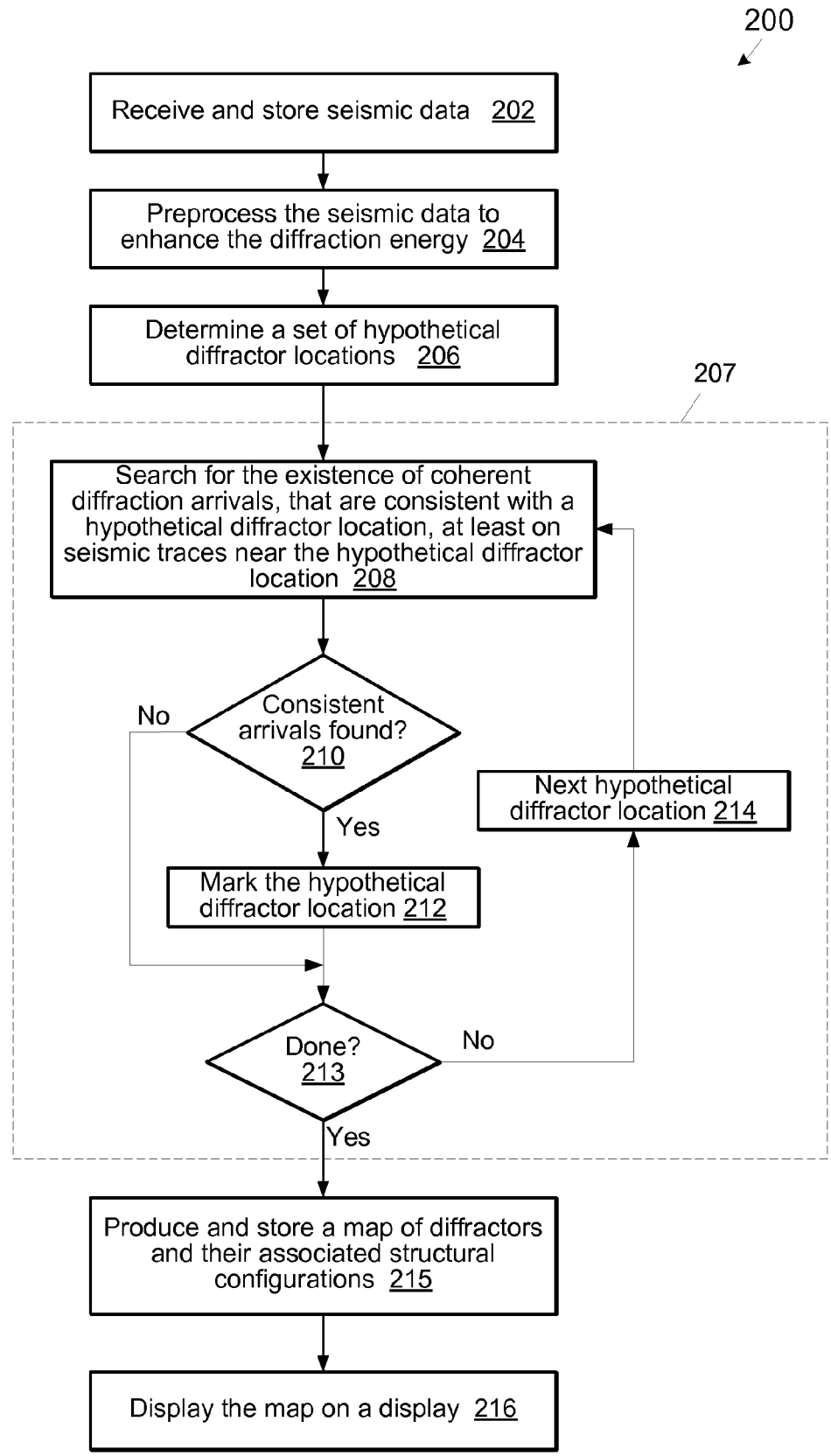
FIG. 2 is a flowchart illustrating a method for analyzing seismic data according to one set of embodiments.

FIG. 2 is a flowchart illustrating one set of embodiments of a method 200 for locating subsurface diffractors. The method may be realized as a software program that is stored on a memory medium and executed by a computer system. For example, the software program may be stored in one or more of the memory devices 115 of system 100 and may be executed by processor unit 110.

At 202, the computer system may receive seismic data and store the seismic data into memory (e.g., into one or more of the memory devices 115 of system 100). The seismic data may be 2-D seismic data that includes one or more 2-D seismic lines acquired over an exploration area. For example, the 2-D seismic data may include a plurality of 2-D seismic lines that are acquired at different times and/or along different tracks. The tracks may intersect each other and/or intersect themselves. However, there is no requirement that they do so. (Note that the term "seismic line", according to its standard definition, does not require that the traces of the seismic line be acquired along a linear track in space. Indeed, in many situations, the traces of a seismic line are acquired along a curvilinear track, e.g., as when the traces are acquired by towing a string of sensors behind a boat. See, e.g., item 1 of FIG. 3B.) As another example, the 2-D seismic data may include only one 2-D seismic line. That single 2-D seismic line may be acquired along a curved track. (The term "curved" is meant to encompass any track that is not linear. Thus, a curved track need not be smooth. For example, a polyline track is considered as being curved.) The curved track may intersect itself one or more times, or not at all. The curved track may weave about to cover the exploration area. The curved track may be a closed circuit or multiple traversals of a closed circuit.

In some embodiments, the seismic data may satisfy a coarseness constraint. For example, the 2-D seismic data may have a sufficiently large interline spacing such that the seismic data are not amenable to 3-D seismic migration imaging. The term "large interline spacing" refers to a spacing between lines of approximately 200 meters or more. In the case where the seismic data includes only one seismic line, the interline spacing is interpreted as being infinite.

Figure 3A:
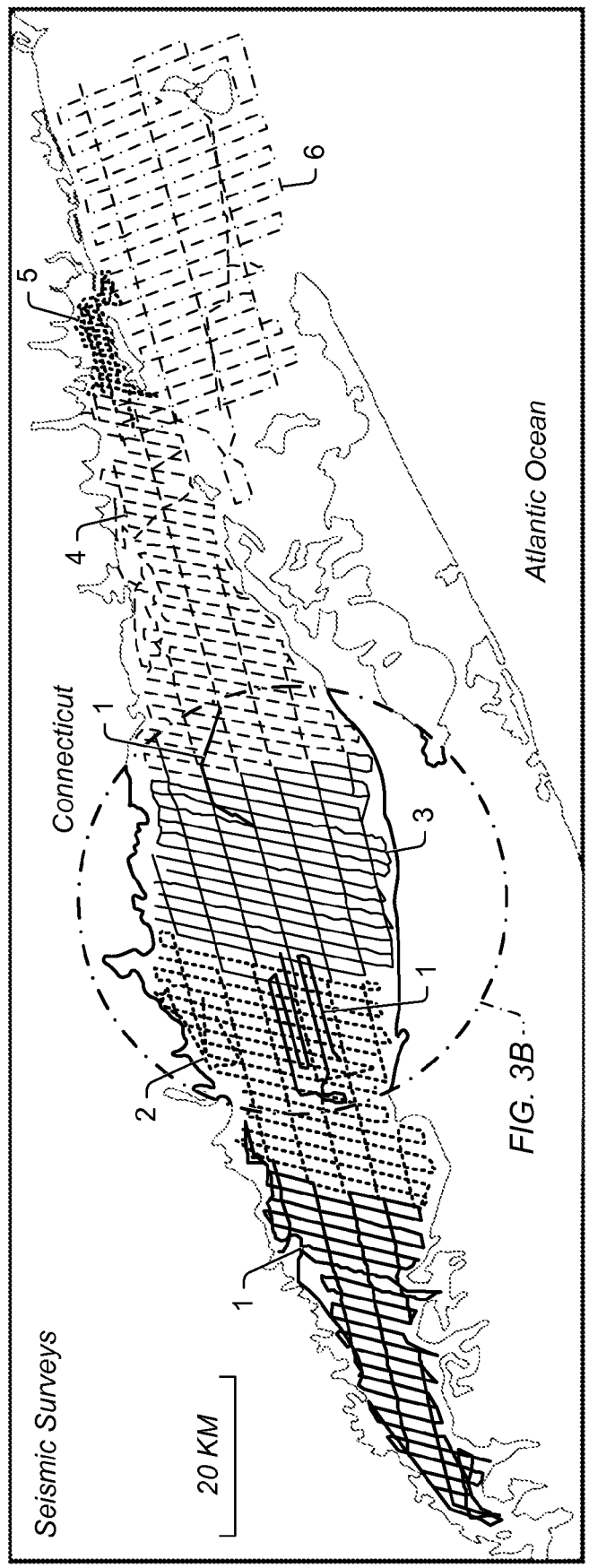
FIG. 3A is a diagram of six overlapping seismic surveys taken in Long Island Sound.
Figure 3B:
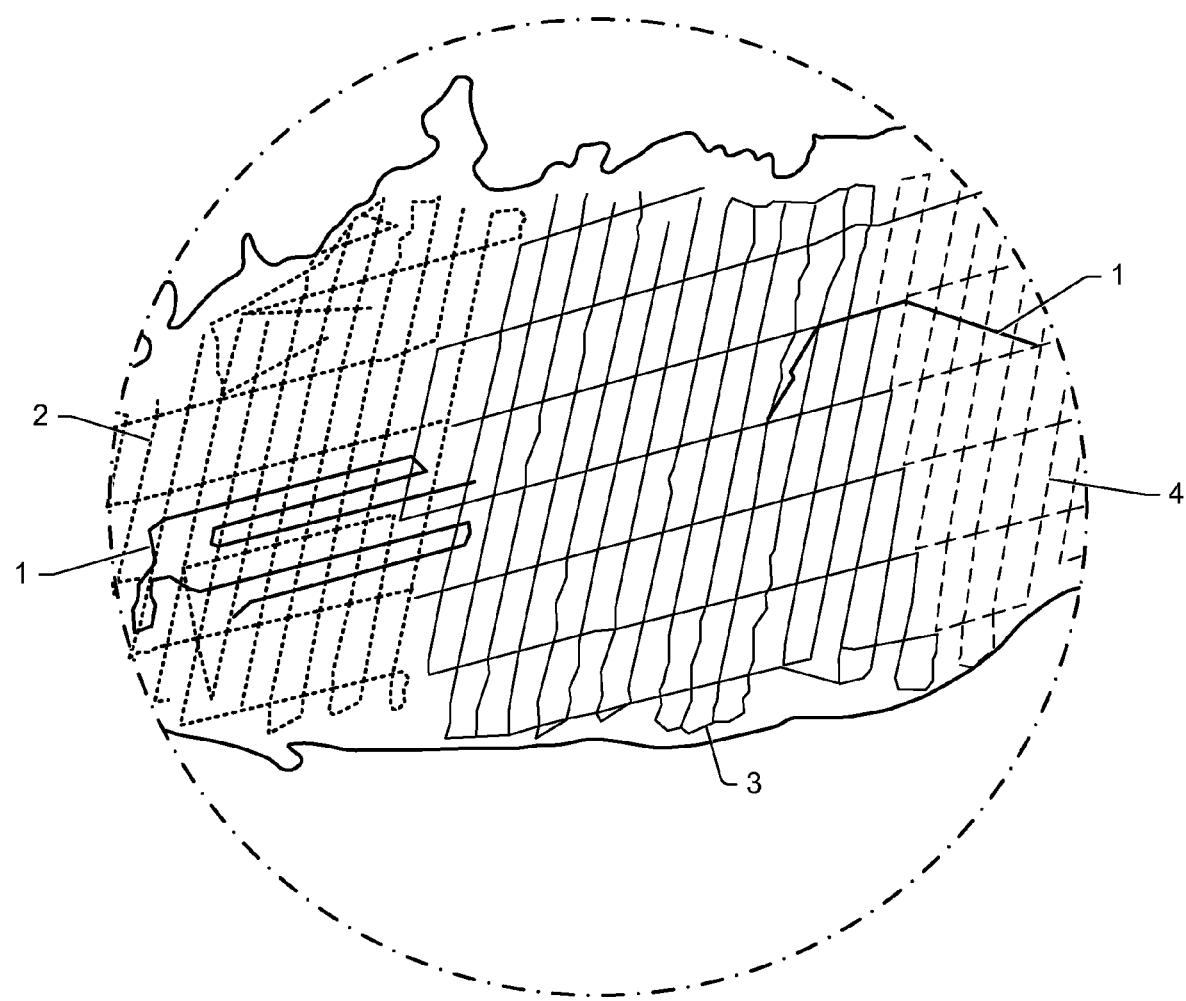
FIG. 3B shows an expanded portion of the diagram of FIG. 3A, i.e., a portion that includes a plurality of crisscrossing seismic lines from seismic surveys 1, 2, 3, and 4.

FIG. 3A presents a diagram of six overlapping seismic surveys taken in Long Island Sound. FIG. 3B presents an expanded portion of FIG. 3A that illustrates a plurality of crisscrossing seismic lines from seismic surveys 1, 2, 3, and 4.

At 204, the computer system preprocesses the seismic data to enhance the diffracted energy according to any of various preprocessing techniques. In one embodiment, the preprocessing may include simple dip/velocity filtering to enhance the steep tails characteristic of diffraction arrivals, e.g., as described in Moser, Landa and Peterson, "Velocity model based diffraction filtering" (SEG Extended Abstracts, 1999), which is hereby incorporated by reference in its entirety. In another embodiment, the preprocessing may include more sophisticated focusing/defocusing transformations, e.g., as described in Harlan, Claerbout and Rocca, "Signal/noise separation and velocity estimation" (Geophysics, 49(11), 1984), or in Khaidukov, Landa and Moser, "Diffraction imaging by a focusing-defocusing approach" (SEG Extended Abstracts, 2003), which are hereby incorporated by reference in their entireties.

At 206, the computer system may determine a set of hypothetical diffraction locations, i.e., locations that are to be explored to determine if acoustic energy is diffracted from those locations. Thus, the modifier "hypothetical" is used to suggest that the locations are "candidate" or "potential" locations of diffractors in the subsurface. The hypothetical diffractor locations may be distributed in the subsurface, e.g., to cover a subsurface volume (or area). For example, the hypothetical diffractor locations may cover a volume generally underneath the surface tracks of the one or more 2-D seismic lines.

In some embodiments, the hypothetical diffractor locations may be determined by a 3-D array of cells that span the underground volume (or some portion thereof), with one (or more) of the hypothetical diffractor locations situated in each cell of the array, e.g., at the center of each cell.

Figure 4A:
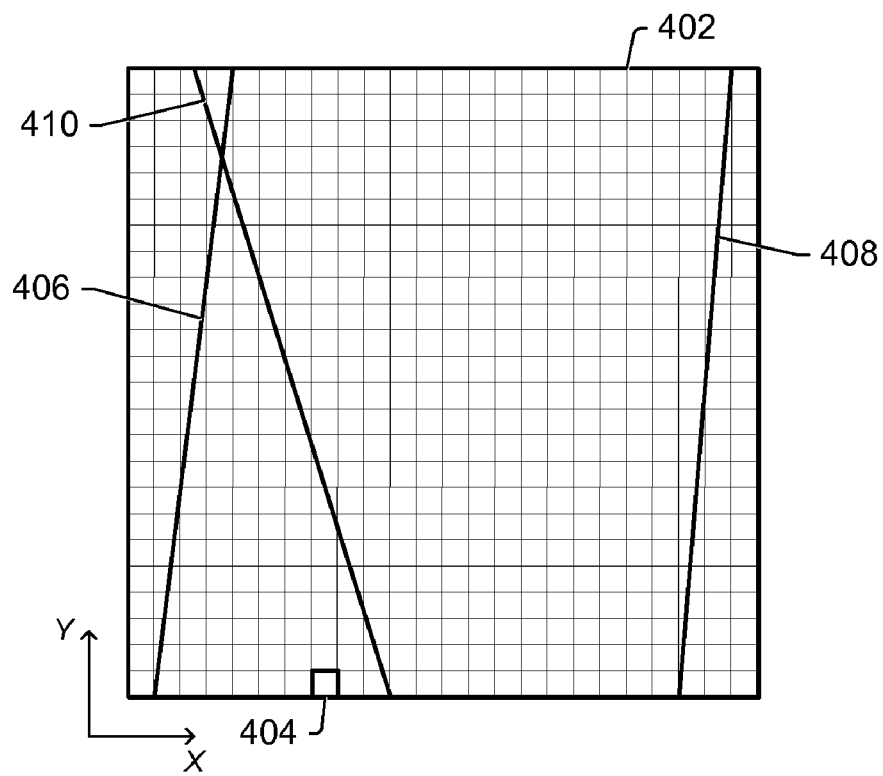
FIG. 4A presents a top view of an exemplary 3-D array 402 of cells that includes a seismic line 408 and crossing seismic lines 406 and 410.
Figure 4B:
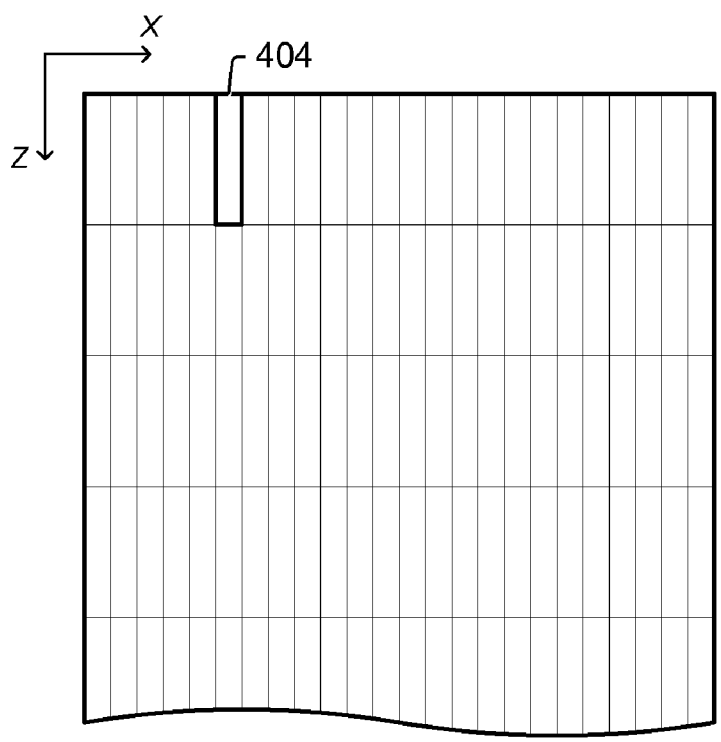
FIG. 4B presents an underground side view of the exemplary 3-D array 402.
Figure 4C:
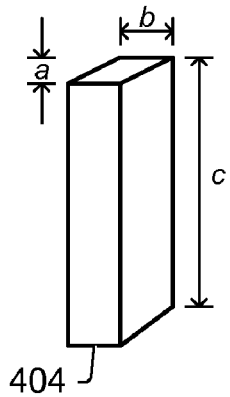
FIG. 4C presents a perspective view of an exemplary cell.

FIG. 4A presents a top view of an exemplary 3-D array 402 of cells that includes a seismic line 408 and crossing seismic lines 406 and 410. FIG. 4B presents an underground side view of the exemplary 3-D array 402. Various cell dimensions and/or shapes may be used, as desired. FIG. 4C presents a perspective view of an exemplary cell 404 as a rectangular solid with dimensions a, b, and c. In one embodiment, the cells of the array are cubes of side length L, where L is up to 50 meters.

In other embodiments, N hypothetical diffractor locations may be randomly selected within the underground volume (where N is a positive integer selected to provide a desired average separation between hypothetical diffractor locations). In yet other embodiments, the cell shape and/or size may be varied or be irregular within the underground volume, to provide a greater density of hypothetical diffractor locations in portions of the volume where a user (e.g., a geologist or explorationist) may expect to find diffractor locations, and a lesser density in other portions of the underground volume.

In one set of embodiments, the hypothetical diffractor locations may satisfy a constraint of being sufficiently distant from trace positions of the one or more 2-D seismic lines included in the seismic data. Each of the 2-D seismic lines may include a plurality of seismic traces. Each of the seismic traces may have two associated pairs of coordinates, one pair that describes the location of the source and a second pair that describes the location of the sensor. Often the midpoint between the two, the so-called common depth point (CDP) position, is usefully associated with the trace and is also used to mark the course of a seismic line. In some embodiments, each of the hypothetical diffractor locations satisfies the condition that none of the trace positions (e.g., CDP positions) of the one or more 2-D seismic lines lies within a neighborhood of diameter 200 meters centered on the hypothetical diffractor location. The neighborhood of diameter 200 meters may be a 3D ball of diameter 200 meters, according to the Euclidean norm or any other desired norm. (In one embodiment, the set of hypothetical diffractor locations includes a mixture of locations that satisfy the 200-meter neighborhood constraint and others that do not.)

Figure 4D:
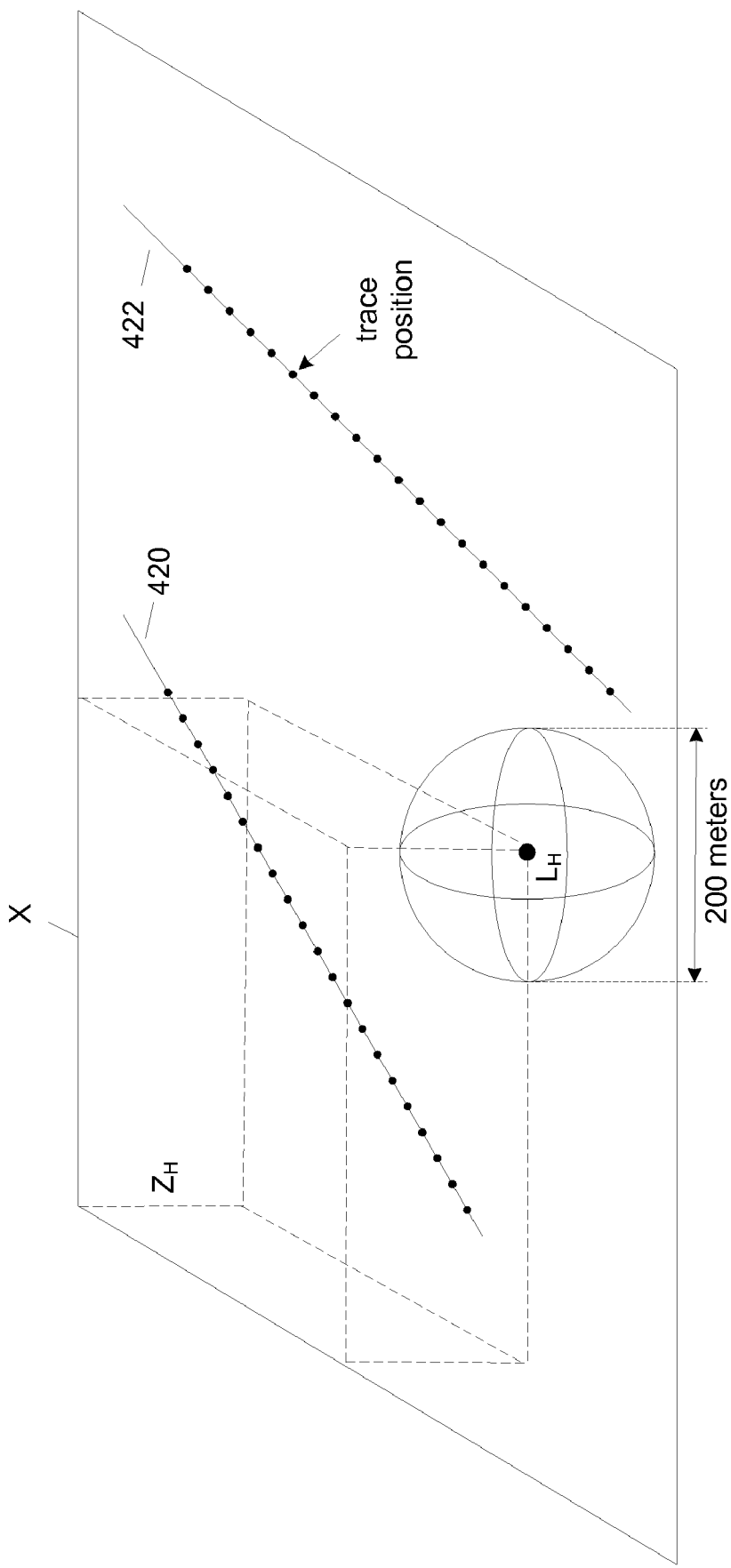
FIG. 4D illustrates an example of a hypothetical diffractor location, where the 3D ball of 200 meters diameter around that hypothetical diffractor location misses all the seismic trace positions in the 2-D seismic data.

FIG. 4D shows an exemplary hypothetical diffractor location $L_H$ with a 3D ball of diameter 200 meters centered around it. The location $L_H$ is shown as having a depth $Z_H$ below the horizontal plane X. Also shown are two sets of trace positions, one set corresponding to seismic line 420 and another set corresponding to seismic line 422. The tracks of the seismic lines 420 and 422 are illustrated as being in the horizontal plane X. None of the trace positions lies within the 3D ball.

The computer system may perform 208 and 210 for each hypothetical diffractor location in the set of hypothetical diffractor locations. The process of iterating over the set of hypothetical diffractor locations is suggested at 213 and 214.

As indicated at 208, for a given hypothetical diffractor location, the computer system may search the seismic data for the existence of coherent diffraction arrivals that are consistent with the hypothetical diffractor location. In some embodiments, the search for coherent diffraction arrivals may be conducted on all the seismic data, i.e., on all the traces from the one or more 2-D seismic lines. In other embodiments, the search for coherent diffraction arrivals may be conducted on a subset of the seismic data, e.g., on traces (from the one or more 2-D seismic lines) acquired near the hypothetical diffractor location. In one embodiment, the distance d of a trace from the hypothetical diffractor location may be calculated and compared to a threshold distance $D_T$ to determine whether the trace is to be included in the search. The threshold distance $D_T$ is typically no larger than 15 kilometers. The threshold distance $D_T$ may be specified by a user. In some embodiments, the search for coherent diffraction arrivals is conducted over a selected subset of the seismic lines, where the seismic data includes a plurality of seismic lines. The selected subset of seismic lines may be seismic lines that are near the hypothetical diffractor location.

The search process 208 may be performed in a number of different ways.

In one embodiment of the search process 208, the computer system may compute semblance (which is often used in conventional velocity analysis) or some other measure of coherence along one or more predicted arrival time trajectories associated with the hypothetical diffractor location. This computation provides a likelihood measure of the presence of a diffractor at the hypothetical diffractor location. (Standard exploration geophysics definitions and formulas for coherence and semblance may be employed for this computation. One source for such standard definitions and formulas is R. E. Sheriff's "*Encylopedic Dictionary of Exploration Geophysics*" published by the Society of Exploration Geophysics, which is hereby incorporated by reference in its entirety.) For each trace in the set of traces to be searched (analyzed), a diffraction arrival time may be determined by performing a ray tracing computation for a ray that starts at the respective source position, extends to the hypothetical diffractor location, and thence to the respective sensor position, using a given velocity model for the subsurface. The resulting trajectory of arrival time versus trace index (or trace position) may be used to align the traces of the search set prior to the semblance computation. Other methods may be used to determine the arrival time trajectory. For example, the trajectory may be computed based on an analytical formula expressing the arrival time as a function of the source position, sensor position, hypothetical diffractor location and a velocity model.

In another embodiment of the search process 208, the computer system may, following the above cited approach of Harlan, Claerbout and Rocca, first compute a summation over the presumed diffraction arrival path with the 2-D seismic data and then compute a summation over the same presumed path a second time with a randomized version of the 2-D seismic data. A comparison of the relative amplitudes of the two summations may be used to determine if the hypothetical diffractor location is a likely diffractor location.

In yet another embodiment of the search process 208, the computer system may compute a simple weighted summation of trace amplitudes along one or more predicted arrival-time trajectories associated with the hypothetical diffractor location to directly focus the diffraction, producing a relative strength estimate at the same time. The weights may be chosen to emphasize the nearly linear tails often characteristic of the diffraction surface in the 2-D seismic data. Alternatively, the weights may be chosen according to migration imaging theory in order to produce a diffraction strength estimate that is linearly related to the true subsurface diffraction strength.

The search process 208 may be interpreted as the opposite of earthquake epicenter location, which involves identifying correlated arrivals at multiple locations and then back solving to determine the epicenter. Instead, the search process 208 examines possible epicenters (i.e., possible diffractor locations) and then determines if there are properly correlated arrivals at the sensor stations (or a substantial fraction of the sensor stations).

Figure 5:
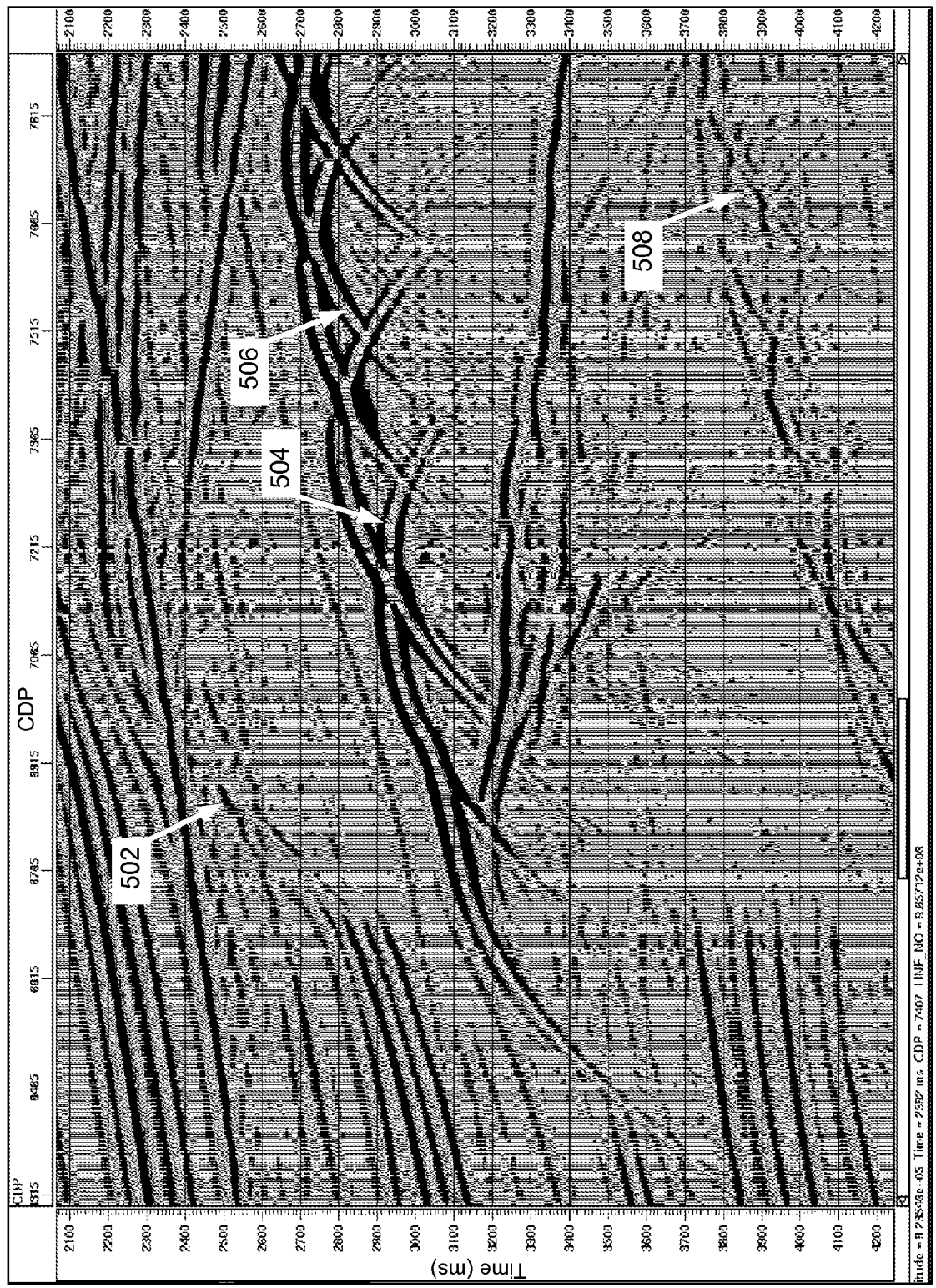
FIG. 5 shows a synthetic seismogram section showing hyperbolic diffractions 504 and 506 and linear diffraction tails 502 and 508 from diffractors located nearby the seismogram section.

FIG. 5 shows a synthetic seismogram section showing hyperbolic diffractions 504 and 506 and linear diffraction tails 502 and 508 from diffractors located nearby the seismogram section.

At 210, the computer system determines (i.e., decides) if consistent diffraction arrivals have been found for the hypothetical diffractor location. For example, in the coherence embodiment, the semblance value (or other coherence measure) for the hypothetical diffractor location may be compared to a threshold. A value larger than the threshold indicates the existence of consistent diffraction arrivals. In the randomization embodiment, the difference between the randomized summation and the non-randomized summation may be compared to a threshold. A difference value larger than the threshold indicates the existence of consistent diffraction arrivals. In the weighted summation embodiment, the weighted summation may be compared to a threshold. A weighted summation value larger than the threshold indicates the existence of consistent diffraction arrivals.

If consistent arrivals have been found for the hypothetical diffractor location, the computer system may mark the hypothetical diffractor location (or information may be otherwise stored) to indicate that the hypothetical diffractor location is an actual (or probable) diffractor location, as indicated at 212.

At 213, the computer system determines if there are any hypothetical diffractor locations remaining to be examined. If so, the computer system advances to the next hypothetical diffractor location, as indicated at 214.

After the set of hypothetical diffractor locations has been examined, the computer system may proceed with 215.

Figure 6:
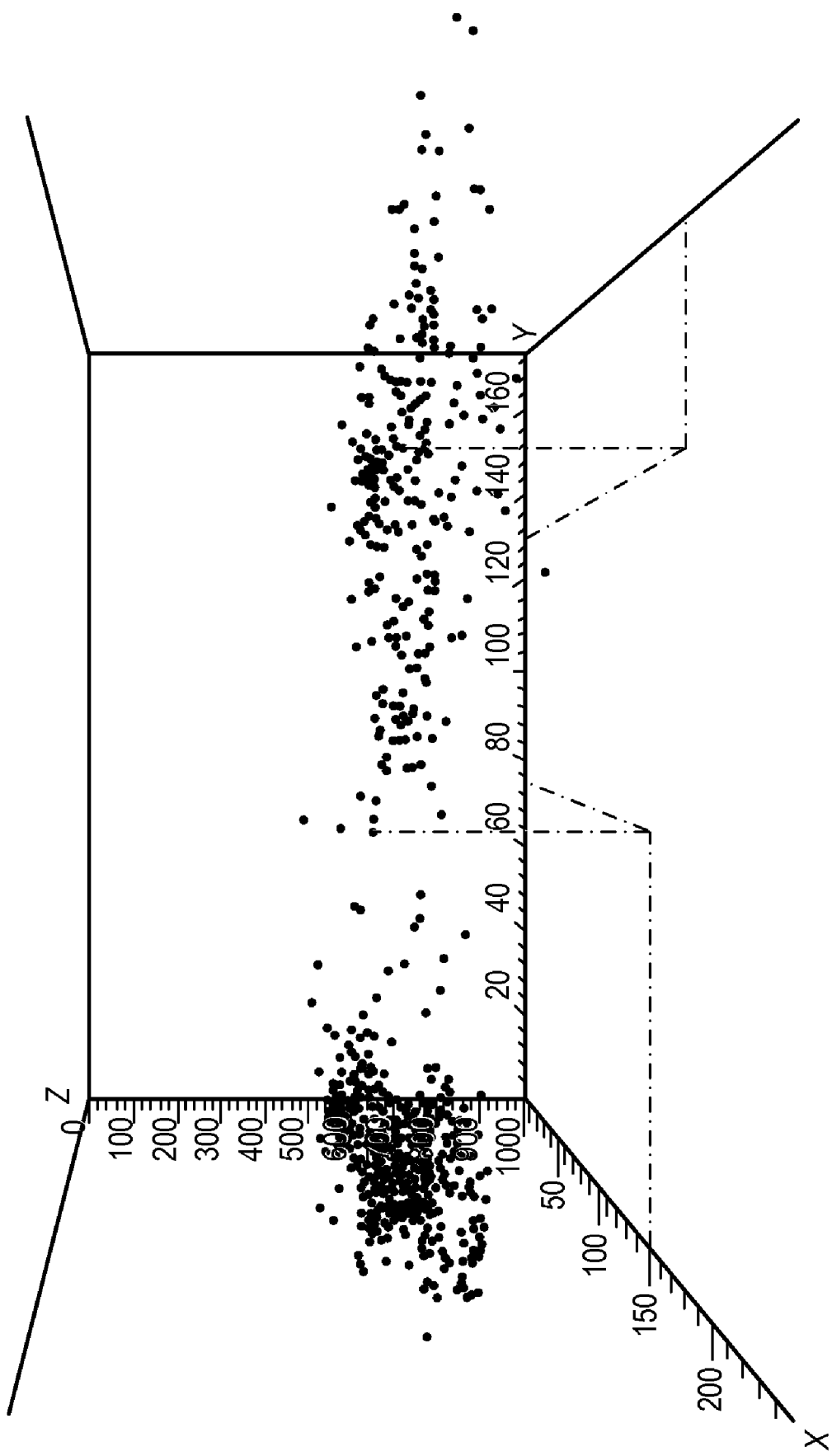
FIG. 6 provides an exemplary 3-D image of identified diffractor locations.

At 215, the computer system may produce a map (or image) of the diffractor locations and store the map in memory (e.g., one of the memory devices 115). The map may be useful in interpreting the structural configurations of diffracting objects and/or surfaces. FIG. 6 is an exemplary 3-D image of the diffractor locations.

At 216, the map (or image) of the diffractor locations and/or other relevant data produced by process 215 may be displayed on a display and/or analyzed to assess the subsurface formation. The collection of diffractor locations may be loaded into a 3-D visualization system so that a person may then identify areas of high diffraction and, perhaps, be able to interpret their alignment in terms of geologic templates such as fault curves, horst-and-graben features, or intrusive diapirs of salt or shale. Decisions regarding where to explore (e.g., by acquiring 3-D seismic infill data or drilling an exploratory well) in the formation for hydrocarbons may be made based on analysis of the information produced at 215.

In some embodiments, the process 206 for determining a hypothetical diffractor location set and the exploration process 207 may be performed a number of times. Thus, different sets of hypothetical diffractor locations, e.g., different grids, may be explored as described above. For example, in a "coarse to fine" approach, a coarse grid (e.g., one having 50 m×50 m×50 m cell size) may be used to determine hypothetical diffraction locations, followed by one or more iterations of finer grids (e.g., a grid having 25 m×25 m×25 m or 10 m×10 m×10 m cell size) at possible regions of diffraction identified in the coarse iteration.

Various embodiments of the methods described herein may enable the imaging of diffractors, e.g., point scatterers of seismic energy, in the earth's subsurface. Diffracted energy is omni-directional and arrives coherently on all nearby seismic lines, usually appearing as approximately hyperbolic "sideswipe". Such scatterers are provided by the edges of interrupted strata such as appear in structural plays such as growth faults, horst-and-graben structures, salt, shale or volcanic intrusions, and/or buried erosional channels.

In one alternative embodiment, the computer system may generate an estimate for the likelihood that a diffractor is present at each hypothetical diffractor location instead of a binary yes/no decision. The value of this estimate may be stored (or associated) with the hypothetical diffraction location. Then the likelihood estimate for each hypothetical diffractor location may be used to control the opacity (or intensity or color or some other visual property) of the hypothetical diffractor location in a map (or image) of the subsurface volume.

Figure 7:
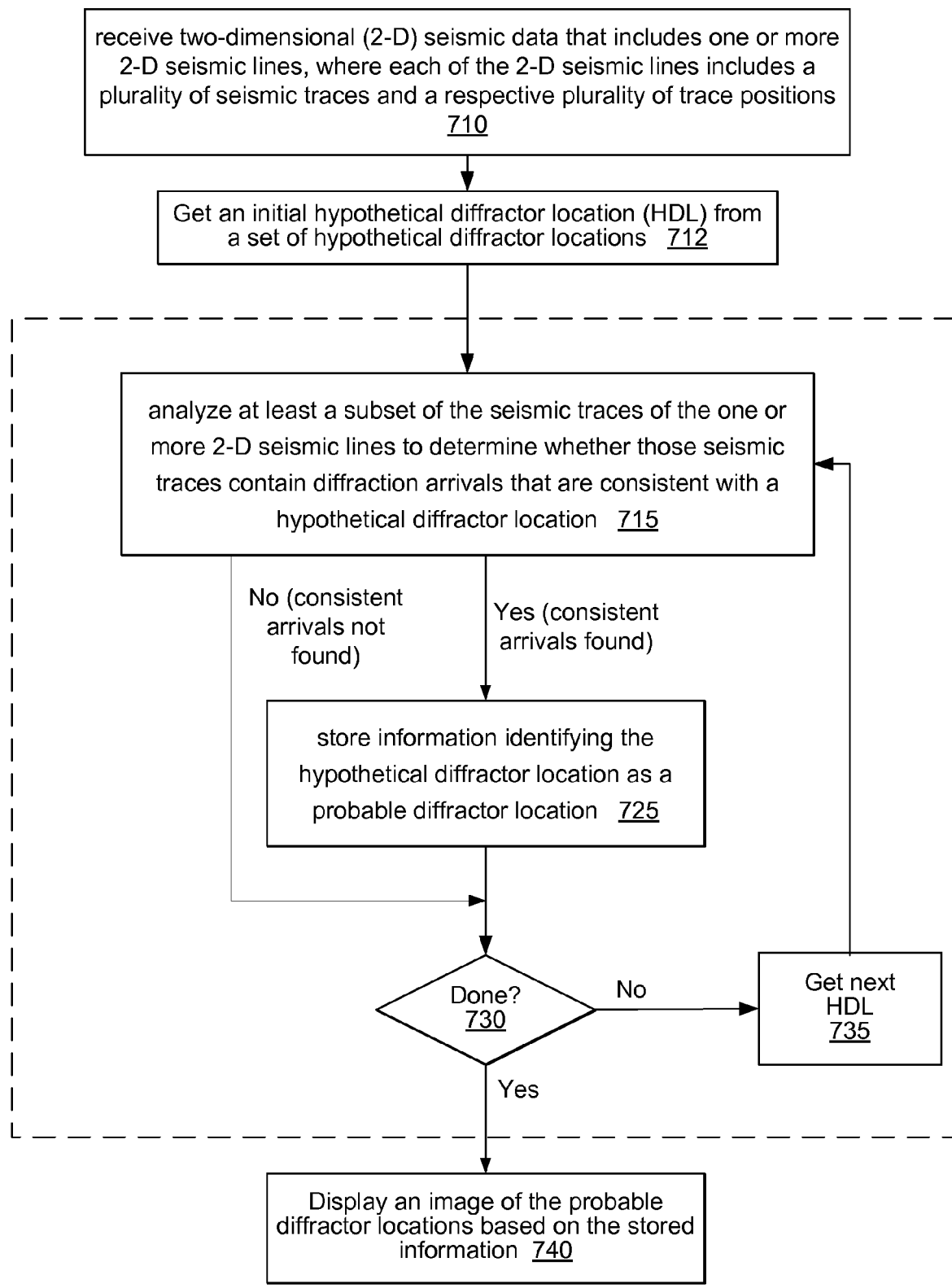
FIG. 7 illustrates one set of embodiments of a method for locating subsurface diffractors.

In one set of embodiments, a method for analyzing seismic data may involve the following operations, as shown in FIG. 7.

At 710, a computer system (such as computer system 100) may receive two-dimensional (2-D) seismic data, e.g., seismic data obtained from a seismic survey of a formation. The 2-D seismic data may include one or more 2-D seismic lines. Each of the 2-D seismic lines may include a plurality of seismic traces and a respective plurality of trace positions. The trace positions specify where the seismic traces were obtained (i.e., acquired during the seismic survey).

At 712, the computer system may access an initial hypothetical diffractor location (HDL) from a set S of hypothetical diffractor locations. Each of the hypothetical diffractor locations of the set S satisfies the condition that none of the trace positions of the one or more 2-D seismic lines lies within a 3-D neighborhood of diameter 200 meters centered on the hypothetical diffractor location.

At 715, the computer system may analyze at least a subset of the seismic traces of the one or more 2-D seismic lines to determine whether those seismic traces contain diffraction arrivals that are consistent with the hypothetical diffractor location. The analysis may be performed as described above in connection with process 208 of FIG. 2, e.g., by computing semblance (or some other coherence measure) along one or more predicted trajectories associated with the hypothetical diffractor location.

In response to a determination (the "yes" result of 715) that the analyzed seismic traces contain diffraction arrivals that are consistent with the hypothetical diffractor location, the computer system may store information identifying the hypothetical diffractor location as a probable diffractor location, as suggested at 725.

At 730, the computer system may determine if there are remaining hypothetical diffractor locations of the set S to explore. If so, the computer system proceeds to 735.

At 735, the computer system accesses the next hypothetical diffractor location (HDL) from the set S of hypothetical diffractor locations and proceeds to 715.

If the set S of hypothetical diffractor locations has been exhausted, the computer system proceeds to 740.

At 740, the computer system may display an image of the probable diffractor locations based on the information stored at 725.

In some cases, the received 2-D seismic data may include a plurality of 2-D seismic lines, where the interline spacing between any two of the lines is greater than or equal to 200 meters.

In some cases, the received 2-D seismic data may include only one 2-D seismic line, where the trace positions of the one 2-D seismic line reside on a track that is not a straight line.

In some cases, the received 2-D seismic data includes only one 2-D seismic line, where the trace positions of the one 2-D seismic line reside on a track that intersects itself.

In some situations, the received 2-D seismic data may include traces obtained using one or more sources and/or one or more sensors situated in one or more boreholes.

In some embodiments, the method of FIG. 7 may also involve analyzing one or more hypothetical diffractor locations that fail the 200 meter neighborhood condition. (A location fails the 200 meter neighborhood condition if at least one trace from at least one of the one or more 2D seismic lines resides within a neighborhood of diameter 200 meters around that location.)

In one set of embodiments, a method for analyzing seismic data may involve the following operations, as shown in FIG. 8.

As shown at 810, a computer system (such as computer system 100 of FIG. 1) may receive 2-D seismic data that includes one or more 2-D seismic lines. Each of the 2-D seismic lines may include a plurality of seismic traces and a respective plurality of trace positions. The trace positions may specify where the seismic traces were obtained (during a seismic survey).

As shown at 820, for each hypothetical diffractor location L in a set S of hypothetical diffractor locations, the computer system may analyze at least a subset of the seismic traces of the one or more 2-D seismic lines to compute a corresponding value $V_L$ indicating an extent to which those seismic traces contain diffraction arrivals that are consistent with the hypothetical diffractor location. Each of the hypothetical diffractor locations of the set S satisfies the condition that none of the trace positions of the one or more 2-D seismic lines lies within a 3-D neighborhood of diameter 200 meters centered on the hypothetical diffractor location.

As indicated at 830, the computer system may generate an image based on the computed values $V_L$.

The computer system may display the image using a display system.

In some embodiments, the computer system may preprocess the received 2-D seismic data to enhance diffracted energy prior to performing operation 820. The preprocessing may include performing dip/velocity filtering to enhance a steep tails characteristic of the diffraction arrivals.

In some embodiments, the set of hypothetical diffractor locations (used in operation 820) is organized as a 3-D grid.

In some embodiments, the received 2-D seismic data may include a plurality of 2-D seismic lines, where the interline spacing between any two of the seismic lines is greater than or equal to 200 meters.

In some embodiments, the process of analyzing said at least a subset of the seismic traces may include computing a measure of coherence along one or more predicted trajectories associated with the hypothetical diffractor location, e.g., as described above in connection with FIG. 2. The coherence measure may be semblance.

In some embodiments, the process of analyzing said at least a subset of the seismic traces may includes: (a) computing a summation over a presumed diffraction arrival path in said at least a subset of the seismic traces, wherein the presumed diffraction arrival path is based on the hypothetical diffractor location, and (b) computing a summation over the presumed diffraction arrival path a second time in a randomized version of said at least a subset of the seismic traces, where said value $V_L$ is based on the relative magnitudes of the two summations.

In some embodiments, the received 2-D seismic data includes only one 2-D seismic line, where the trace positions of the single 2-D seismic line reside on a track that is not a straight line.

In some embodiments, the method of FIG. 8 may also involve analyzing one or more hypothetical diffractor locations that fail the 200 meter neighborhood condition.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A computer accessible memory medium that stores program instructions for analyzing seismic data, wherein the program instructions are executable by one or more processors to:

receive two-dimensional (2-D) seismic data obtained from a seismic survey of a formation, wherein the 2-D seismic data includes one or more 2-D seismic lines, wherein each of the 2-D seismic lines includes a plurality of seismic traces and a respective plurality of trace positions, wherein the trace positions specify where the seismic traces were obtained;

for each hypothetical diffractor location in a set of hypothetical diffractor locations, perform a set of operations including:

analyzing at least a subset of the seismic traces of the one or more 2-D seismic lines to determine whether those seismic traces contain diffraction arrivals that are consistent with the hypothetical diffractor location, wherein each of the hypothetical diffractor locations satisfies a condition that none of the trace positions of the one or more 2-D seismic lines lies within a 3-D neighborhood of diameter 200 meters centered on the hypothetical diffractor location wherein an image is generated from the stored information;

in response to determining that the analyzed seismic traces contain diffraction arrivals that are consistent with the hypothetical diffractor location, storing information identifying the hypothetical diffractor location as a probable diffractor location.

2. The memory medium of claim 1, wherein the 2-D seismic data includes only one 2-D seismic line, wherein the trace positions of the one 2-D seismic line reside on a track that is not a straight line.

3. The memory medium of claim 1, wherein the 2-D seismic data includes only one 2-D seismic line, wherein the trace positions of the one 2-D seismic line reside on a track that intersects itself.

4. The memory medium of claim 1, wherein the 2-D seismic data includes traces obtained using one or more sources situated in one or more boreholes.

5. The memory medium of claim 1, wherein the 2-D seismic data includes traces obtained using one or more seismic sensors situated in one or more boreholes.

6. The memory medium of claim 1, wherein the 2-D seismic data includes a plurality of 2-D seismic lines, wherein the interline spacing between any two of the lines is greater than or equal to 200 meters.

7. The memory medium of claim 1, wherein said analyzing said at least a subset of the seismic traces includes computing a measure of coherence along one or more predicted trajectories associated with the hypothetical diffractor location.

8. The memory medium of claim 7, wherein the coherence measure is a semblance value.

9. The memory medium of claim 1 further comprising: displaying an image of the probable diffractor locations based on said stored information.

10. A method for analyzing seismic data, the method comprising:

a computer system receiving two-dimensional (2-D) seismic data that includes one or more 2-D seismic lines, wherein each of the 2-D seismic lines includes a plurality of seismic traces and a respective plurality of trace positions, wherein the trace positions specify where the seismic traces were obtained;

for each hypothetical diffractor location in a set of hypothetical diffractor locations, the computer system analyzing at least a subset of the seismic traces of the one or more 2-D seismic lines to compute a value indicating an extent to which those seismic traces contain diffraction arrivals that are consistent with the hypothetical diffractor location, wherein each of the hypothetical diffractor locations satisfies a condition that none of the trace positions of the one or more 2-D seismic lines lies within a 3-D neighborhood of diameter 200 meters centered on the hypothetical diffractor location;

the computer system generating an image based on the computed values.

11. The method of claim 10 further comprising: the computer system displaying the image using a display system.

12. The method of claim 10 further comprising: the computer system preprocessing the 2-D seismic data to enhance diffracted energy prior to said analyzing.

13. The method of claim 12, wherein said preprocessing the 2-D seismic data includes performing dip/velocity filtering to enhance a steep tails characteristic of the diffraction arrivals.

14. The method of claim 10, wherein the set of hypothetical diffractor locations forms a 3-D grid.

15. The method of claim 10, wherein the 2-D seismic data includes a plurality of 2-D seismic lines, wherein the interline spacing between any two of the seismic lines is greater than or equal to 200 meters.

16. The method of claim 10, wherein said analyzing said at least a subset of the seismic traces includes computing a measure of coherence along one or more predicted trajectories associated with the hypothetical diffractor location.

17. The method of claim 16, wherein the coherence measure is a semblance value.

18. The method of claim 10, wherein said analyzing said at least a subset of the seismic traces includes:

computing a summation over a presumed diffraction arrival path in said at least a subset of the seismic traces, wherein the presumed diffraction arrival path is based on the hypothetical diffractor location; and computing a summation over the presumed diffraction arrival path a second time in a randomized version of said at least a subset of the seismic traces, wherein said value is based on the relative magnitudes of the two summations.

19. The method of claim 10, wherein the 2-D seismic data includes only one 2-D seismic line, wherein the trace positions of the one 2-D seismic line reside on a track that is not a straight line.

20. A computer system comprising:

a processor; and memory that stores program instructions, wherein the program instructions are executable by the processor to:

receive two-dimensional (2-D) seismic data that includes one or more 2-D seismic lines, wherein each of the 2-D seismic lines includes a plurality of seismic traces and a respective plurality of trace positions, wherein the trace positions specify where the seismic traces were obtained;

for each hypothetical diffractor location in a set of hypothetical diffractor locations, analyze at least a subset of the seismic traces of the one or more 2-D seismic lines to compute a value indicating an extent to which those seismic traces contain diffraction arrivals that are consistent with the hypothetical diffractor location, wherein each of the hypothetical diffractor locations satisfies a condition that none of the trace positions of the one or more 2-D seismic lines lies within a 3-D neighborhood of diameter 200 meters centered on the hypothetical diffractor location; and generate an image based on the computed values.

* * * * *